United States Patent
Adcock et al.

(10) Patent No.: US 11,015,736 B1
(45) Date of Patent: May 25, 2021

(54) CLAMP UTILIZING A SHAPE MEMORY ALLOY ACTUATOR TO SHUTOFF, SQUEEZE OFF, PLASTIC PIPE AND TUBING USED IN THE PRESSURIZED TRANSMISSION OF GAS OR FLUID

(71) Applicant: Vector Ring LLC, Houston, TX (US)

(72) Inventors: George Stephen Adcock, Houston, TX (US); Larry Dean Corley, Conroe, TX (US)

(73) Assignee: Vector Ring LLC, Houston, TX (US)

(*) Notice: Subject to any disclaimer, the term of this patent is extended or adjusted under 35 U.S.C. 154(b) by 86 days.

(21) Appl. No.: 16/256,182

(22) Filed: Jan. 24, 2019

(51) Int. Cl.
*F16K 99/00* (2006.01)
*F16K 7/06* (2006.01)
*F16B 1/00* (2006.01)
*B25B 5/10* (2006.01)

(52) U.S. Cl.
CPC .......... *F16K 99/0038* (2013.01); *B25B 5/102* (2013.01); *F16B 1/0014* (2013.01); *F16K 7/06* (2013.01)

(58) Field of Classification Search
CPC ........ F16K 7/06; F16K 7/061; F16K 99/0038; F16B 1/0014; F16B 2/065; F16B 2/12; B25B 5/102; B25B 5/106
See application file for complete search history.

(56) References Cited

U.S. PATENT DOCUMENTS

| | | |
|---|---|---|
| 363,971 A | 5/1887 | Smead |
| 3,341,909 A | 9/1967 | Havener |
| 3,575,405 A | 4/1971 | Harding |
| 3,589,668 A | 6/1971 | Gill |
| 3,599,960 A | 8/1971 | Phillips |
| 3,730,478 A | 5/1973 | Burke et al. |
| 4,565,589 A | 1/1986 | Harrison |
| 4,743,079 A | 5/1988 | Bloch |
| 5,127,228 A | 7/1992 | Swenson |
| 5,219,146 A | 6/1993 | Thompson |
| 5,540,689 A * | 7/1996 | Sanders ................. F16B 1/0014 606/276 |
| 6,065,934 A * | 5/2000 | Jacot ....................... F03G 7/065 244/99.8 |
| 6,499,952 B1 | 12/2002 | Jacot et al. |
| 6,746,461 B2 * | 6/2004 | Fry ....................... A61B 17/122 606/157 |
| 7,159,398 B1 | 1/2007 | Bushnell et al. |

(Continued)

FOREIGN PATENT DOCUMENTS

CN 101693357 A 4/2010

*Primary Examiner* — Ryan A Reis
(74) *Attorney, Agent, or Firm* — McKee, Voorhees & Sease, PLC

(57) ABSTRACT

This present invention utilizes a shape memory alloy (SMA) to improve on prior art in the design of clamps used for shut off, squeeze off, of plastic pipe which transmits gas or fluid under pressure. More particularly, but not exclusively, the present invention incorporates SMAs as actuators to simplify and improve clamp design for squeeze off of plastic pipe that is used in the transmission of pressurized gas and fluid. This invention may be deployed and operated remotely by the user. This present invention relates specifically to the application of trained SMA tubes, rods, bars, and beams as actuators for clamping and squeeze off of plastic pipe and tubing used to transmit gas or fluid.

20 Claims, 11 Drawing Sheets

(56) References Cited

U.S. PATENT DOCUMENTS

| | | |
|---|---|---|
| 7,559,525 B2 | 7/2009 | Grimes |
| 9,732,776 B2 | 8/2017 | Madsen et al. |
| 9,885,345 B2 | 2/2018 | Calkins et al. |
| 2007/0071575 A1* | 3/2007 | Rudduck ............... F16B 21/183 411/386 |
| 2010/0050399 A1* | 3/2010 | Browne ................. F16B 2/065 24/455 |
| 2010/0109322 A1* | 5/2010 | Zavattieri ............... F16L 33/02 285/381.2 |
| 2014/0017025 A1* | 1/2014 | Hemingway ............ H02G 3/32 411/15 |
| 2016/0064750 A1* | 3/2016 | Ostadi ................ F16K 99/0044 429/7 |

\* cited by examiner

CLAMP UTILIZING A SHAPE MEMORY ALLOY ACTUATOR TO SHUTOFF, SQUEEZE OFF, PLASTIC PIPE AND TUBING USED IN THE PRESSURIZED TRANSMISSION OF GAS OR FLUID

BACKGROUND OF THE INVENTION

This present invention relates to the application of Nickel Titanium or other shape memory alloy as an actuator for clamping and shutoff, squeeze off, of plastic pipe and tubing used in the transmission of gas or fluid under pressure. Natural gas, water and other fluids are routinely transported using flexible plastic, polyolefin, pipe and tubing. The fluids are pressurized to move, transmit, them through pipes which may be called "pressure pipe".

Clamping is commonly performed by construction and safety personnel to shutoff natural gas, water, and other fluid flow through plastic pipes. During construction and for safety shutoff, or other reasons, the flow of fluids through a pipe must be stopped. It may be necessary to permanently halt the flow, or only temporarily stop the flow. Current methods employ manual or powered clamps which allow operators to safely and securely shutoff gas or fluid flow through pressure pipe. One of the values of using plastic pipe is its ability to recover its shape and continue to safely transmit the fluid subsequent to a squeeze off clamping event.

The enabling technology for this invention is shape memory alloys (SMAs). SMAs experience a reversible shape change from a martensite state to an austenite state as a result of a change in temperature. Austenite and martensite are different internal crystal structures of the alloys. A SMA element is created, forged, into a desired form such as a tube, rod, bar, or beam. It is then set by mechanical deformation into a preferred shape, the austenite set shape ($A_s$), using high temperature ($T_s$). Once set and cooled back to its martensite state the element retains the set shape, $A_s$.

The SMA element is then mechanically deformed. It will hold the new deformed shape, the martensite start shape ($M_s$), until heated to the austenite start temperature ($T_{as}$), which is significantly lower than the temperature, $T_s$, used to set the austenite shape. At this temperature, the element will begin to revert to the set shape, $A_s$. It will continue to deform toward that set shape as the temperature is raised until it is as close to the set shape as the mechanical force being continuously applied for training allows. This is the austenite finish shape ($A_f$) which may approximate, but is unlikely to equal, $A_s$. This shape occurs at the austenite finish temperature ($T_{af}$), which is higher than $T_{as}$, but also significantly lower than the temperature, $T_s$, used to set the shape, $A_s$. As the element cools below the martensite start temperature ($T_{ms}$) it will begin to revert to the martensite start shape, $M_s$, finally obtaining that shape at the martensite finish temperature ($T_{mf}$).

Training of SMA elements is accomplished by thermal cycle training. This training requires repeated cycles of heating and cooling between the $T_{mf}$ and $T_{af}$ temperatures while the SMA element is under mechanical strain. An SMA element will revert from the trained austenite finish shape, $A_f$, to the martensite start shape, $M_s$, as the material cools to the martensite finish temperature, $T_{mf}$. After training, the SMA element will cycle between the two shapes $M_s$ and $A_f$ as it is heated from $T_{mf}$ to $T_{af}$ and then cooled back to $T_{mf}$. These physical characteristics of SMAs are used in this invention to enable different embodiments of clamps for squeeze off, via clamping, of pressurized gas or fluid flow through plastic pipe.

Clamping technology has a long history (U.S. Pat. No. 636,971A). Clamps of various design have been created to meet specific needs (U.S. Pat. Nos. 3,341,909A, 4,743, 079A). In recent decades, the transmission of pressurized fluids through plastic pipe for commercial and residential use has become standard practice. Current technology provides construction personnel, police, and fire departments either manual or powered mechanisms for pressure pipe squeeze off clamping (U.S. Pat. Nos. 3,589,668A, 3,730, 478A, 3,575,405A, 3,599,960A, 5,219,146A, 7,559,525B2). These devices can be heavy and difficult to deploy. Therefore, what is needed is a lighter weight and easier to deploy device for squeeze off of plastic gas and fluid pressure pipe.

The discovery of Nickel Titanium (NiTi) alloys, one of the known shape memory alloys, has provided a material which may be used here as an actuator (U.S. Pat. Nos. 5,127,228A, 4,565,589A, 6,065,934A, 6,499,952B1, 9,885, 345B2, 7,159,398B1) for the design of a new and unique type of clamp which meets these basic needs for the squeeze off of plastic pressure pipe. Prior Art clamps have been designed using shape memory alloys (CN101693357A, U.S. Pat. No. 9,732,776B2), but not in the same manner or for the unique application described herein.

BRIEF SUMMARY OF THE INVENTION

Therefore, it is a primary object, feature, or advantage of the present invention to improve upon the state of the art by creating a device which provides users an easy, safe, and efficient means for squeeze off, via clamping, of pressurized gas or fluid flow through plastic pipe.

It is a further object, feature, or advantage of the present invention to provide users of this device a means of deploying the device for squeeze off of a pipe at a distance from the user, such as from outside a building interior or exterior wall, or from the earth's surface to a pipe buried in the earth. This remote deployment method may be an extension of the handle to provide the user a means of operating or powering the device of this invention at a distance from the user, or may include remote triggering using a wireless mechanism.

It is a further object, feature, or advantage of the present invention that the device is not dangerous to use in a flammable environment, and will not cause or induce sparks through its use, or via static electrical buildup.

It is a further object, feature, or advantage of the present invention that it may be utilized as a onetime clamp for permanent pipe closure or as a temporary clamp which may be released through a subsequent user-initiated action, allowing fluid flow to resume.

One or more of these and/or other objects, features, or advantages of the present invention will become apparent from the Specification and Claims that follow. No single embodiment need meet all of these objects, features, or advantages and different embodiments may meet different objects, features, or advantages. The present invention is not to be limited by or to these objects, features, or advantages.

BRIEF DESCRIPTION OF THE SEVERAL VIEWS OF THE DRAWINGS

The above-mentioned features of this invention, and the methods of attaining them, will become more apparent and the invention itself will be better understood by reference to the following description of embodiments of the invention taken in conjunction with the accompanying figures, wherein.

DETAILED DESCRIPTION OF THE INVENTION

Figure 1:
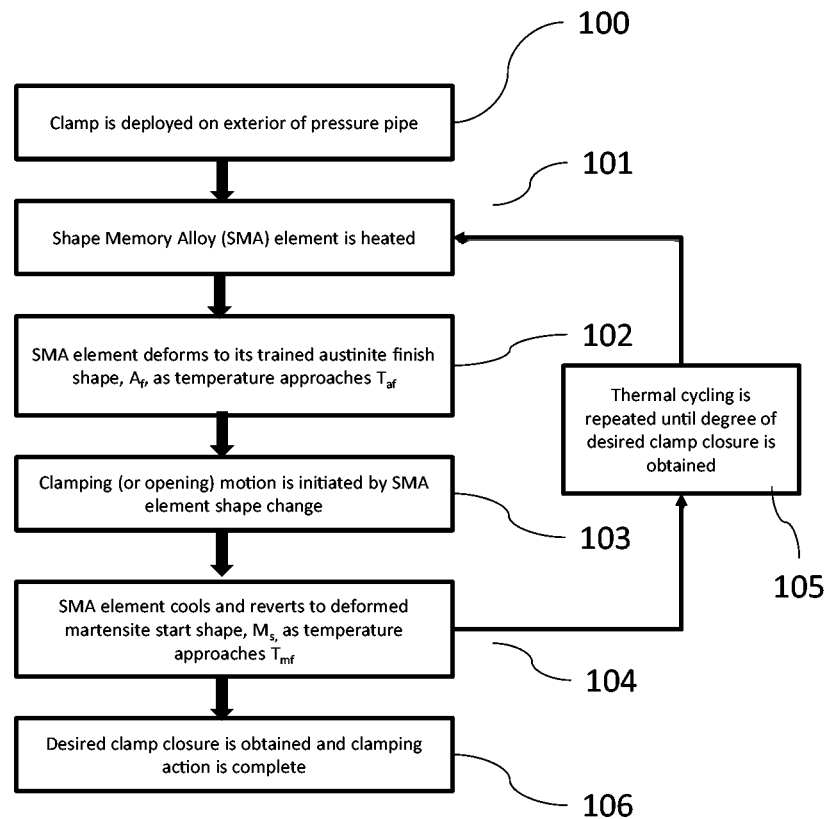
FIG. 1 is a flowchart of the function of the device of this invention.

FIG. 1 is a flowchart of the function of the device of this invention. The clamp is deployed on the exterior of a pressure pipe (100). The shape memory alloy (SMA) element is heated (101) and deforms to the trained austenite phase shape (102) as it approaches the austenitic shape set temperature ($A_s$). A clamping motion is initiated (103) by the shape change. The SMA element cools and reverts to the martensite phase shape (104). The process is repeated (105), which is operational thermal cycling, until the desired amount of clamp closure is achieved (106). In the device of this invention, the proper operation of the device may require multiple operational thermal cycles. Operational thermal cycles for the invention of this device are driven by electrical direct or indirect current, induction, conduction, or convection but may be driven by any other means or process that creates sufficient temperature differential. Activation of the device of this invention may be accomplished at a distance from the device by use of a handle extension or remote trigger.

Figure 2:
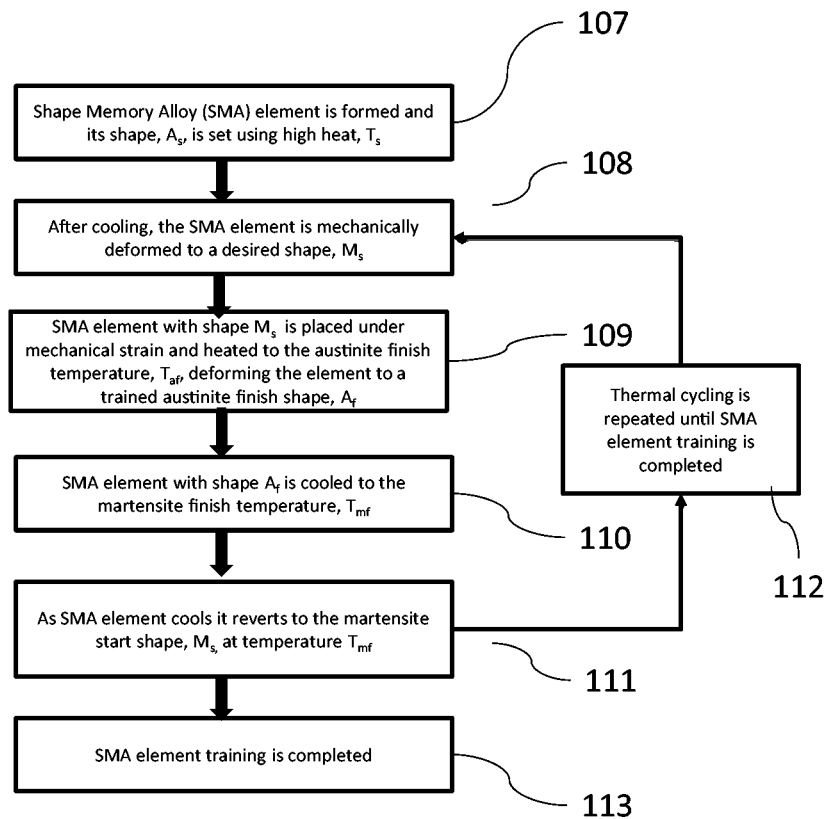
FIG. 2 is a flowchart of the training of an SMA element of the device of this invention.

FIG. 2 is a flowchart of the training for a shape memory alloy (SMA) element of the device of this invention. The SMA element is formed and then set to a desired shape ($A_s$) at a high temperature ($T_s$) (107). The SMA element is cooled and then mechanically deformed to a desired shape, $M_s$ (108). The SMA element is then placed under mechanical strain and heated to the austinite finish temperature, $T_{af}$, which deforms the element to a trained austinite finish shape, $A_f$ (109). The SMA element is then cooled to the martensite finish temperature, $T_{mf}$ (110), causing it to revert to the $M_s$ shape (111). The thermal training cycle is repeated (112) until training of the SMA element is completed (113).

Figure 3:
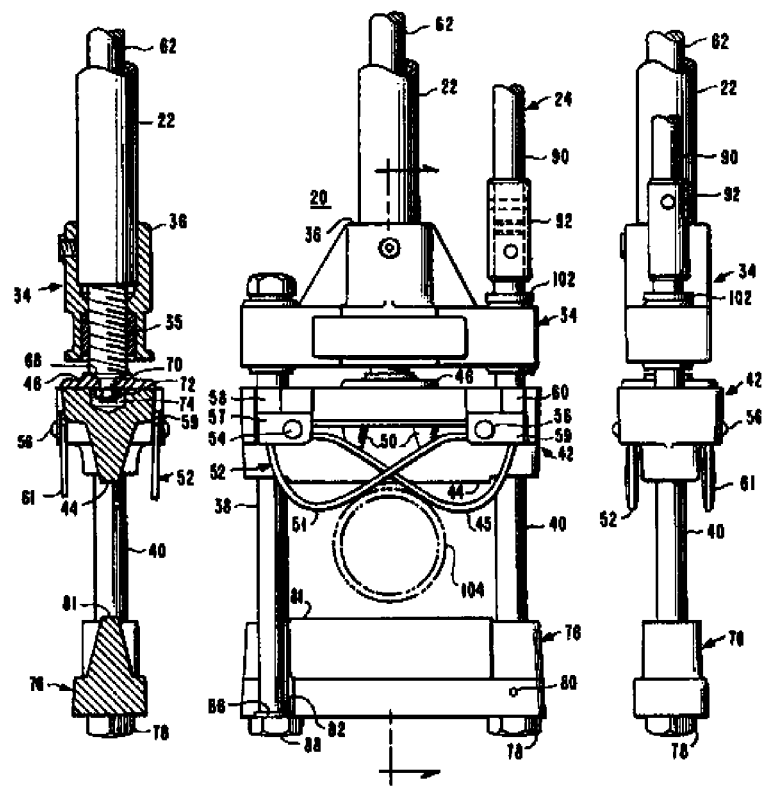
FIG. 3 illustrates a prior art mechanical clamping device.

FIG. 3 is an image of a prior art mechanical clamping device (U.S. Pat. No. 3,589,668A) for plastic pressure pipe which is in common use today. The clamp is positioned over a plastic pipe and secured. The clamp is then activated by a manual screwing motion, forcing the arms of the clamp to close on the pipe and squeeze off fluid flow through the pipe. Hydraulic versions of this and other types of clamp provide powered devices for today's clamp users.

Figure 4:
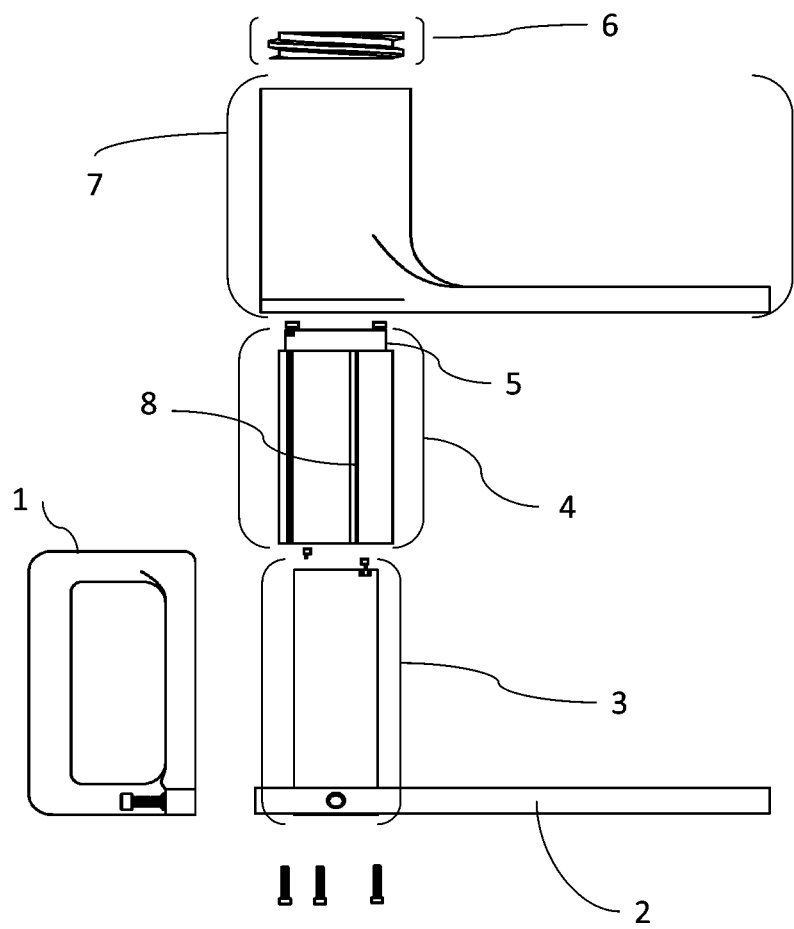
FIG. 4 illustrates an exploded view of one embodiment of the device of this invention.

FIG. 4 illustrates an exploded view of the device of one embodiment of this invention. A handle (1) attaches to a basal clamp arm (2). A shape memory alloy (SMA) tube (3) is secured to the basal clamp arm near the handle. In some embodiments the SMA elements may be rods, bars and beams. A cylindrical element (4) with an inset of the surface near its top (5) fits over the SMA tube, attaches to the basal clamp arm, and provides support for a threaded element (6). The upper clamp arm (7) fits over the threaded element and the cylindrical element. The configuration is stabilized by small ridges on the lower inside of the upper clamp arm which match to grooves (8) on the surface of the cylindrical element. There may be securing, guiding, and stabilizing modifications to the handle and upper clamp arm.

Figure 5:
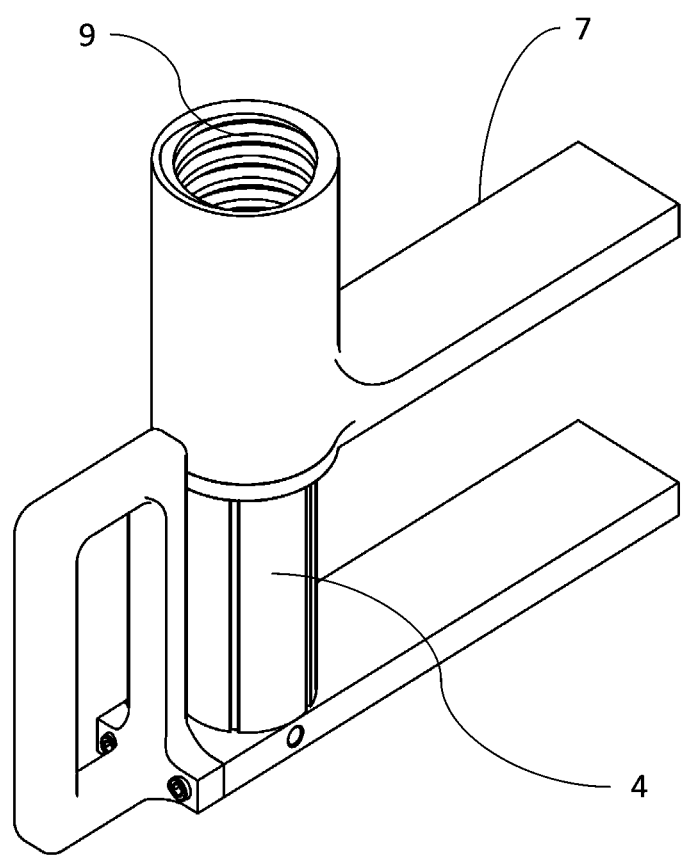
FIG. 5 illustrates the open configuration of this embodiment of the device of this invention.

FIG. 5 illustrates the open configuration of this embodiment of the device of this invention. The upper clamp arm (7) has internal threads (9) which mate the external threads on the threaded element (6, FIG. 3). The cylindrical element (4) helps stabilize the SMA tube and upper clamp arm.

Figure 6:
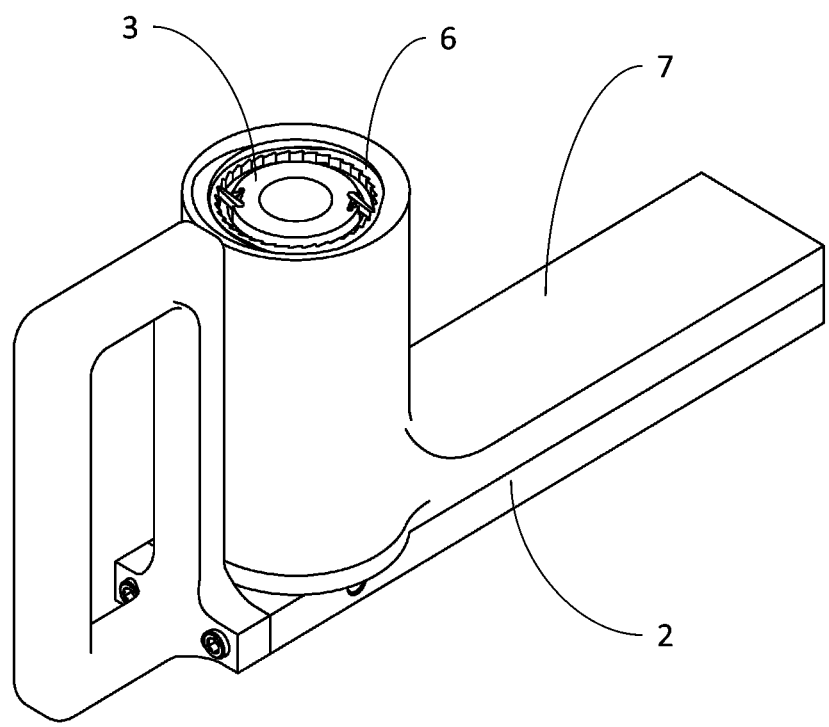
FIG. 6 illustrates the closed configuration of this embodiment of the device of this invention.

FIG. 6 illustrates the closed configuration of this embodiment of the device of this invention. Rotation of the shape memory alloy (SMA) tube (3) as it approaches the austenite finish temperature ($T_{af}$) causes the threaded element (6) to rotate, forcing the upper clamp arm (7) towards the basal clamp arm (2). To reach the desired amount of clamp closure the operational thermal cycle may need to be repeated.

Figure 7:
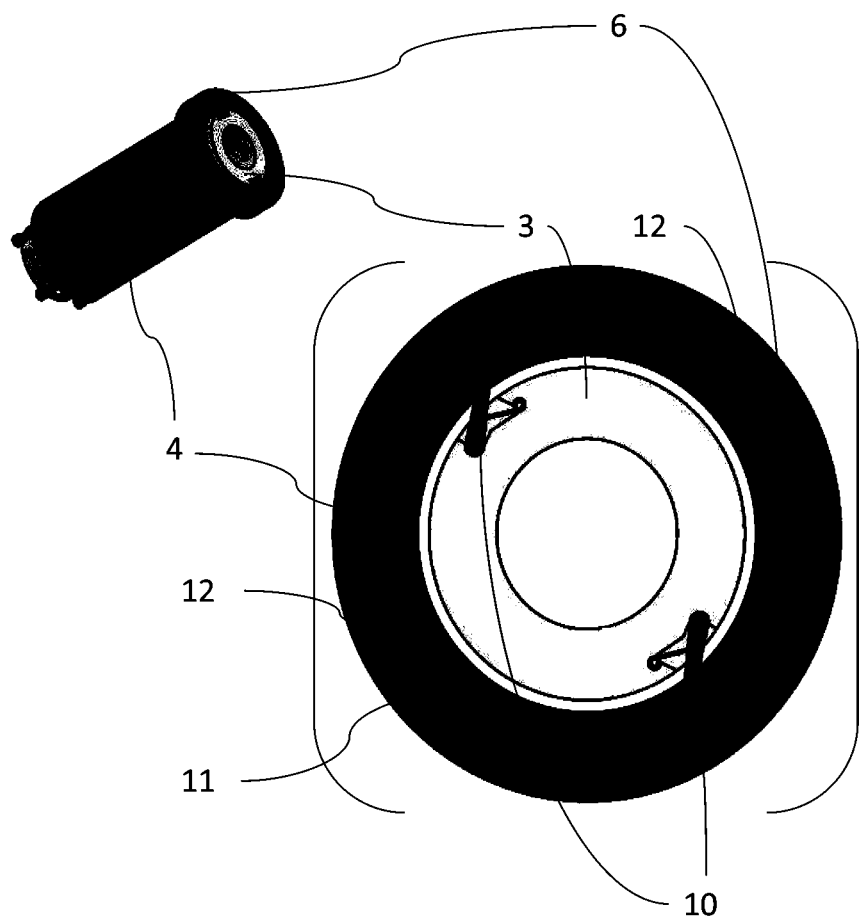
FIG. 7 an expanded top view of a portion of this embodiment illustrating the interaction of the shape memory alloy (SMA) tube, the cylindrical element, and the threaded element.

FIG. 7 an expanded top view of a portion of this embodiment illustrating the interaction of the shape memory alloy (SMA) tube (3), the cylindrical element (4), and the threaded element (6). The trained SMA tube (3) rotates when heated. The rotation of the SMA tube in one direction as it deforms to the austinite finish shape, $A_f$, is captured by pawls (10) which are attached to the SMA tube and act against ratchet teeth (11) on the inside of the threaded element (6). Pawls (12) on the cylindrical element prevent it from rotating in the opposite direction as the SMA tube cools and reverts to its martensite state shape, $M_s$. The operational thermal cycling is repeated until the desired amount of clamp closure is achieved.

Figure 8:
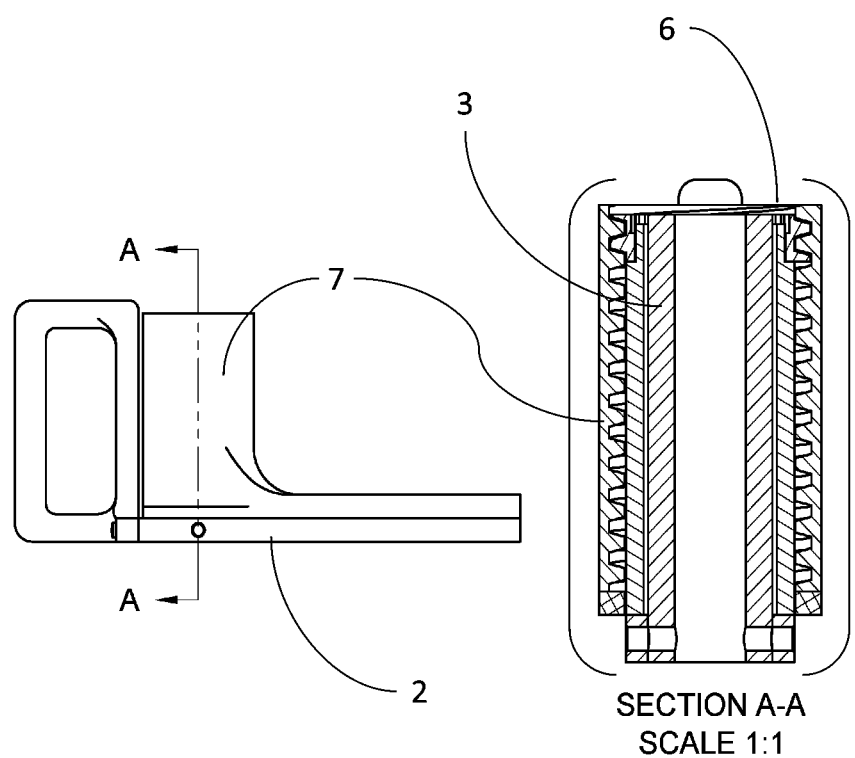
FIG. 8 illustrates a cross-sectional side view of the threaded elements of this embodiment which translate rotary torque from a trained shape memory alloy (SMA) tube ninety degrees to the upper clamp arm, creating a clamping action.

FIG. 8 illustrates a cross-sectional side view of the threaded element (6) of this embodiment which translates rotary torque supplied by a trained shape memory alloy (SMA) tube (3) ninety degrees to the upper clamp arm (7), causing motion of the upper clamp arm towards the basal clamp arm (2) and creating the clamping action for this embodiment of the device of this invention.

Figure 9:
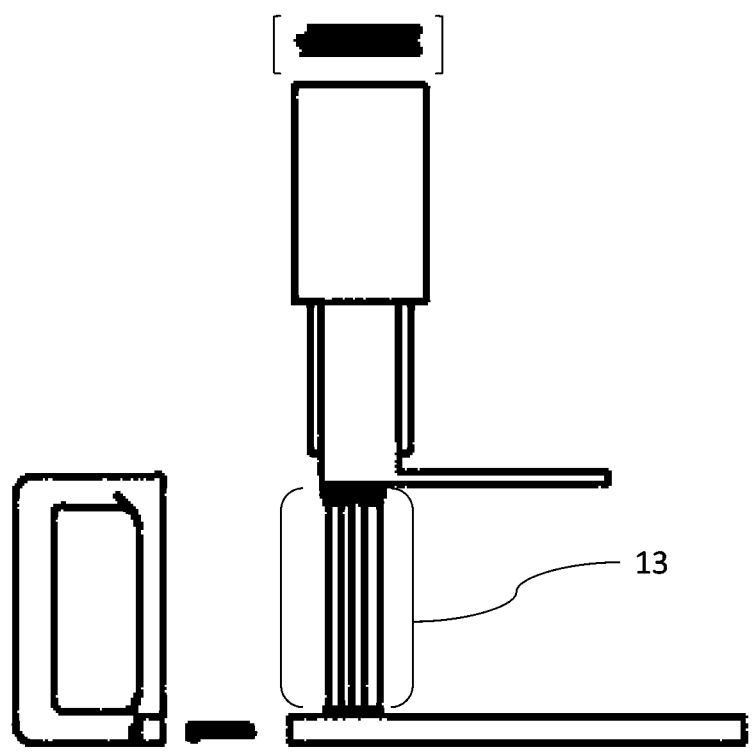
FIG. 9 illustrates an exploded view of a second embodiment of the device of this invention which utilizes a multi-tube shape memory alloy (SMA) rotary motor to drive a clamping action.

FIG. 9 illustrates an exploded view of a second embodiment of the device of this invention which utilizes a multi-tube shape memory alloy rotary motor (13), based on U.S. Pat. No. 6,065,934A, to drive a clamping action. In this second embodiment of the device of this invention, the SMA rotary motor element may contain internal ratchet and screw mechanisms which translate the rotary motion ninety degrees to drive the clamping action.

Figure 10:
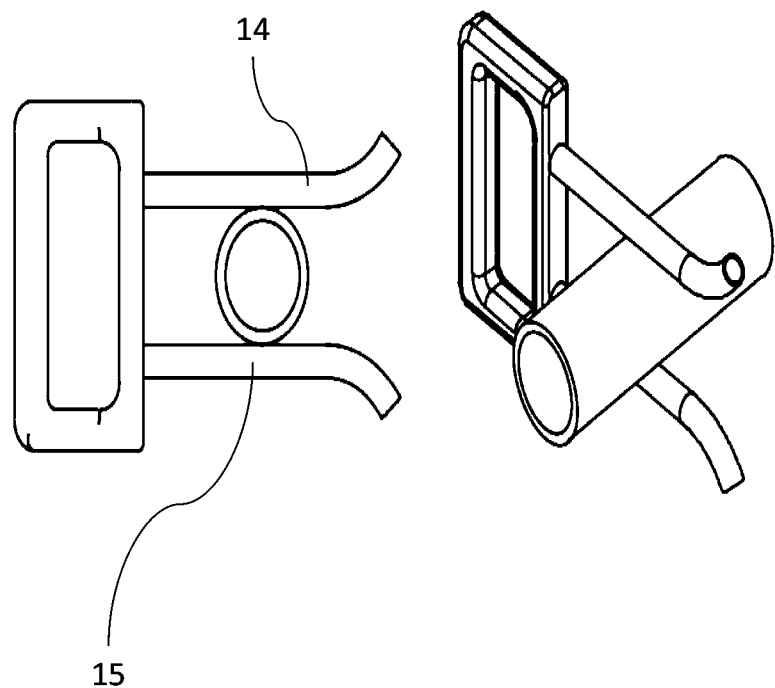
FIG. 10 illustrates the open configuration of a third embodiment of the device of this invention which utilizes shape memory alloy (SMA) elements as upper and lower clamp arms.

FIG. 10 illustrates the open configuration of a third embodiment of the device of this invention which utilizes shape memory alloy (SMA) elements as the upper (14) and lower (15) clamp arms. In some embodiments the clamp arms may have different cross-sections including tubes, rods, bars, and beams.

Figure 11:
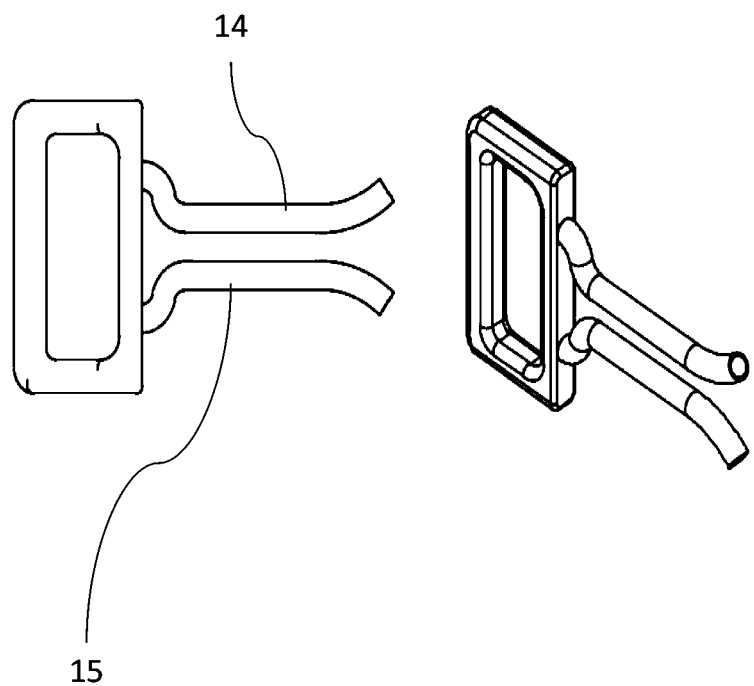
FIG. 11 illustrates the closed configuration of the third embodiment of the device of this invention which utilizes shape memory alloy (SMA) elements as the upper and lower clamp arms.

FIG. 11 illustrates the closed configuration of the third embodiment of the device of this invention which utilizes shape memory alloy (SMA) elements as the upper (14) and lower (15) clamp arms. Activation and deformation of the SMA elements in FIG. 10, to the closed configuration shown here, is accomplished by operational thermal cycling. In some embodiments the clamp arms may have different cross-sections including tubes, rods, bars, and beams.

What is claimed is:

1. A clamping device for applying a clamping force to a plastic pipe comprising:
   a shape memory alloy actuator actuated by repetitive thermal cycling to sequentially increase the clamping force on the plastic pipe with each cycle.

2. The clamping device of claim 1, wherein actuation of the actuator is achieved remotely by an operator who is not physically contacting the pipe.

3. The clamping device of claim 1 wherein the actuator undergoes a phase change during each thermal cycle.

4. The clamping device of claim 3 wherein the actuator changes between austenite and martensite phases.

5. The clamping device of claim 1 wherein the actuator changes crystalline structure during each thermal cycle.

6. The clamping device of claim 1 wherein the actuator rotates during each thermal cycle to increase the clamping force on the plastic pipe.

7. The clamping device of claim 6 further comprising a ratcheting mechanism to retain each rotational change of the actuator.

8. The clamping device of claim 1 wherein the actuator is heated to increase the clamping force.

9. The clamping device of claim 1 wherein the plastic pipe is a polyolefin pipe.

10. A method of clamping a polyolefin pipe, comprising:
    placing a shape memory alloy clamp on the pipe;
    repeatedly thermally cycling the clamp to produce rotational changes in the clamp; and
    each rotational change in the pipe increasing a clamping force on the pipe.

11. The method of claim 10 wherein the thermal cycling generates phase changes in the clamp.

12. The method of claim 11 wherein the phase changes are between austenite and martensite phases.

13. The method of claim 10 wherein thermal cycling generates a crystalline structural change in the clamp.

14. The method of claim 10 further comprising retaining each rotational change in the clamp without releasing the clamping force.

15. The method of claim 14 wherein the rotational change is retained by ratcheting pawls.

16. The method of claim 10 wherein the thermal cycles heat the clamp to increase the clamping force.

17. A clamping device of polyolefin pipe, comprising:
    a shape memory alloy clamp adapted to fit onto the pipe;
    the clamp being repeatedly rotationally tightened by thermal cycling to incrementally clamp the pipe to a closed condition.

18. The device of claim 17 further comprising ratcheting pawls to hold each rotation of the clamp.

19. The device of claim 17 the incremental clamping occurs by heating the clamp.

20. The device of claim 17 wherein the clamp changes phases between austenite and martensite during each thermal cycle.

* * * * *